US012703349B2

(12) United States Patent
Gelso et al.

(10) Patent No.: US 12,703,349 B2
(45) Date of Patent: Aug. 11, 2026

(54) ESTIMATING RISK OF A YAW INSTABILITY OF A VEHICLE

(71) Applicant: VOLVO TRUCK CORPORATION, Gothenburg (SE)

(72) Inventors: Esteban Gelso, Västra Frölunda (SE); Maliheh Sadeghi Kati, Partille (SE); Umur Erdinc, Gothenburg (SE); Björn Groth, Gothenburg (SE); Vi Cuong Thai, Hisings Backa (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/111,183

(22) PCT Filed: Sep. 23, 2022

(86) PCT No.: PCT/EP2022/076551
§ 371 (c)(1),
(2) Date: Mar. 12, 2025

(87) PCT Pub. No.: WO2024/061472
PCT Pub. Date: Mar. 28, 2024

(65) Prior Publication Data
US 2026/0084690 A1 Mar. 26, 2026

(51) Int. Cl.
*B60W 30/02* (2012.01)
*B60D 1/30* (2006.01)
(Continued)

(52) U.S. Cl.
CPC ............... *B60W 30/02* (2013.01); *B60D 1/30* (2013.01); *B60W 10/20* (2013.01);
(Continued)

(58) Field of Classification Search
CPC .... B60W 30/02; B60W 10/20; B60W 40/114; B60W 50/097; B60W 50/14;
(Continued)

(56) References Cited

U.S. PATENT DOCUMENTS

2015/0165850 A1* 6/2015 Chiu ........................ B60D 1/30
701/1
2020/0189591 A1 6/2020 Mellinger, III et al.
(Continued)

FOREIGN PATENT DOCUMENTS

DE 102018122273 A1 3/2020
GB 2513616 A 11/2014

OTHER PUBLICATIONS

International Search Report and Written Opinion of the International Searching Authority in corresponding International Application No. PCT/EP2022/076551 mailed Apr. 28, 2023 (12 pages).
(Continued)

*Primary Examiner* — Jacob M Amick
(74) *Attorney, Agent, or Firm* — Jeffri A. Kaminski; Venable LLP

(57) ABSTRACT

A computer-implemented method for handling yaw instability of a vehicle is provided. The method includes a use of separate prediction models for a short-term time period and a long-term time period for predicting future steering angle information and a future longitudinal motion of the vehicle for the respective periods. The method also includes, based on the respective predicted future steering angle information and future longitudinal motion of the vehicle, estimating a respective short-term and long-term risk for yaw instability of the vehicle. The method also includes, on the basis of the estimated short-term risk and long-term risk, respectively,
(Continued)

determining whether or not to trigger an alert and/or to trigger a preventive action for preventing a yaw instability of the vehicle.

24 Claims, 5 Drawing Sheets

(51) Int. Cl.

| | |
|---|---|
| ***B60W 10/20*** | (2006.01) |
| ***B60W 40/114*** | (2012.01) |
| ***B60W 50/00*** | (2006.01) |
| ***B60W 50/14*** | (2020.01) |
| *B62D 37/00* | (2006.01) |

(52) U.S. Cl.

CPC ...... *B60W 40/114* (2013.01); *B60W 50/0097* (2013.01); *B60W 50/14* (2013.01); *B60W 2050/0031* (2013.01); *B60W 2300/14* (2013.01); *B60W 2510/20* (2013.01); *B60W 2520/14* (2013.01); *B60W 2520/22* (2013.01); *B60W 2540/30* (2013.01); *B60W 2552/15* (2020.02); *B60W 2552/30* (2020.02); *B60W 2556/10* (2020.02); *B60W 2556/40* (2020.02); *B60W 2710/207* (2013.01); *B60W 2720/10* (2013.01); *B62D 37/00* (2013.01)

(58) Field of Classification Search

CPC ......... B60W 2556/10; B60W 2556/40; B60W 2552/15; B60W 2050/0031; B60W 2300/14; B60W 2510/20; B60W 2520/14; B60W 2540/30; B60W 2710/207; B60W 2720/10; B60D 1/30; B60D 1/305; B62D 37/00; B62D 53/0871

See application file for complete search history.

(56) References Cited

U.S. PATENT DOCUMENTS

| | | | | |
|---|---|---|---|---|
| 2020/0216085 | A1* | 7/2020 | Bobier-Tiu ........... | B60W 40/08 |
| 2025/0042404 | A1* | 2/2025 | Jennings ............... | B60W 30/02 |

OTHER PUBLICATIONS

International Preliminary Report on Patentability in corresponding International Application No. PCT/EP2022/076551 mailed Aug. 1, 2024 (7 pages).

* cited by examiner

ESTIMATING RISK OF A YAW INSTABILITY OF A VEHICLE

CROSS-REFERENCE TO RELATED APPLICATIONS

This application is a U.S. National Stage application of PCT/EP2022/076551, filed Sep. 23, 2022 and published on Mar. 28, 2024, as WO 2024/061472, all of which is hereby incorporated by reference in its entirety.

TECHNICAL FIELD

The disclosure relates generally to a field of vehicle motion management. In particular aspects, the disclosure relates to estimating a respective short-term and long-term risk for yaw instability of a vehicle, and on the basis of said respective risks, determining whether or not to trigger an alert and/or to trigger a preventive action. The disclosure can be applied in heavy-duty vehicles, such as trucks, buses, and construction equipment. Although the disclosure may be described with respect to a particular vehicle, the disclosure is not restricted to any particular vehicle.

BACKGROUND

Yaw instability such as jack-knifing and trailer swings of articulated heavy vehicles may result in dangerous traffic situations. Jack-knifing of a lead vehicle unit such as a tractor or truck in an articulated heavy vehicle causes the lead unit to pivot backward into a towed vehicle unit such as a trailer. A jack-knife instability happens when the rear wheels of the lead unit are locked up due to improper and hard braking, or slippery or poor-conditioned roads. Trailer-swings may relate to a trailer of a vehicle swinging out to the side of the vehicle in an uncontrollable manner. Trailer-swing instability typically happens when trailer brakes locks up on a slippery surface.

Lock-up of brakes is one typical cause of yaw instability. However, often a full lock-up does not happen due to anti-lock braking systems (ABS) and/or electronic brake systems (EBS) avoiding such a lock-up. For ABS and/or EBS, the slip may instead grow too much such that there is a low lateral force capability left. For these scenarios, lateral grip cannot be maintained which also causes yaw instability such as a trailer swing and/or jackknifing One way of detecting a jack-knife situation can be performed by observing a yaw angle and yaw rate of a tractor and an articulation angle between the tractor and a trailer. In this way, it may be detected that a jack-knifing has occurred, and mitigation of a dangerous situation can thereby start to take place. One way of stabilizing a jack-knifing vehicle is to use stability controllers which perform differential braking or, stretch-braking. Stretch braking means to brake the trailer more than the tractor, hence the trailer pulls the tractor. It makes the combination more stable and helps to avoid jack-knife situation.

A driver may also detect yaw instabilities manually, and can then try to brake, release brakes, and/or turn a steering angle accordingly to try to resolve the yaw instability.

However, the above approaches can typically only try to resolve a yaw instability such as a trailer swing or jack-knifing when the instability have already started to occur, at which point, it may be too late to avoid a dangerous situation completely.

Hence, there is a strive to improve when managing a yaw instability of a vehicle.

SUMMARY

According to a first aspect of the disclosure, a computer-implemented method for handling yaw instability of a vehicle is provided. The method comprises: by a processor device of a computer system, using separate prediction models for a short-term time period and a long-term time period for predicting future steering angle information for the short-term time period, future steering angle information for the long-term time period, a future longitudinal motion of the vehicle for the short-term time period and a future longitudinal motion of the vehicle for the long-term time period. The steering angle information may for example comprise an angle and/or an angular rate, i.e. how the angle is changing over time. The longitudinal motions may for example comprise any one or more out of a speed, velocity, and/or acceleration of the vehicle. The short-term time period is shorter than the long-term time period. The method further comprises: by the processor device, based on the respective predicted future steering angle information and future longitudinal motion of the vehicle, estimating a respective short-term and long-term risk for yaw instability of the vehicle. The yaw instability may relate to jack-knifing and/or a trailer swing. The method further comprises: by the processor device, on the basis of the estimated short-term risk and long-term risk, respectively, determining whether or not to trigger an alert and/or to trigger a preventive action for preventing a yaw instability of the vehicle. The first aspect of the disclosure may seek to prevent and/or to mitigate a yaw instability, e.g., jack-knifing or trailer swing, in the vehicle before the yaw instability occurs. A technical benefit may include that a safety of the vehicle, its driver/passenger(s) and surrounding road users is improved. This is since the alert and/or preventive action may prevent or mitigate a dangerous situation related to the yaw instability. This is since the alert and/or preventive action can be performed prior to the yaw instability occurrence and thereby significantly reduce the danger presented by the yaw instability. Another technical benefit is that a driver and/or the vehicle will gain more time to react to the potentially dangerous situation of the yaw instability. Furthermore, as both a long-term and short-term risk is estimated, it is possible to determine whether to trigger an alert and/or preventive action based on both a short-term prediction and a long-term prediction. For high short-term risks, the prevention of the yaw instability may be performed in a quick manner before the occurrence of the yaw instability, and for high long-term risks, a more efficiently controlled manner of preventing the yaw instability can be performed.

In some examples, predicting the future steering angle information and respective future longitudinal motion of the vehicle for the short-term time period is based on current and/or historical steering angle information and/or longitudinal motions of the vehicle. A technical benefit may include that the predictions may be performed more accurately and efficiently which further improves safety of the vehicle, its driver/passenger(s) and surrounding road users. This is since it can be assumed that in the short-term time period, the future steering angle information and/or the future longitudinal motion cannot change significantly, e.g., more than a threshold, and the predictions may thereby be performed based on this knowledge. For example, the prediction may be that the future steering angle information and/or longitudinal motions of the vehicle is similar or same as the current and/or historical steering angle information and/or longitudinal motions of the vehicle, e.g., same value, mean value, etc. Another prediction may be that a rate of change can be deduced between the current and historical steering angle information and/or longitudinal motions of the vehicle, and may efficiently be applied when predicting the future steering angle information and/or future longitudinal motions of the vehicle. In other words, for some of these predictions a steering wheel rate can be predicted to stay constant.

In some examples, predicting the future steering angle information and/or the future longitudinal motion for the short-term time period comprises predicting that the future steering angle information and/or the future longitudinal motion is within a predefined range of the current and historical steering angle information and/or longitudinal motion. A technical benefit may include that the predictions can be performed more accurately and efficiently which further improves safety of the vehicle, its driver/passenger(s) and surrounding road users. This is since it can be assumed that in the short-term time period, the future steering angle information and/or the future longitudinal motion cannot change too much, and the predictions can be performed based on this knowledge, and therefore the predictions can be made to be within the predefined range.

In some examples, predicting the future steering angle information and the respective future longitudinal motion of the vehicle for the long-term time period is based at least partly on road map data for one or more road segments which the vehicle is expected to drive on. A technical benefit may include an improved accuracy in predictions of the vehicle on the one or more road segments which further improves safety of the vehicle, its driver/passenger(s) and surrounding road users.

In some examples, the road map data indicates a road curvature and/or a slope for the one or more road segments. A technical benefit may include enabling to predict how the vehicle and/or driver of the vehicle need to drive on the one or more road segments. Hence, a technical benefit may include that the predictions can be performed more accurately which further improves safety of the vehicle, its driver/passenger(s) and surrounding road users.

In some examples, predicting the future steering angle information and/or respective future longitudinal motion of the vehicle for the long-term time period is based at least partly on a pre-defined behavior of the vehicle and/or based at least partly on a pre-defined behavior of a driver of the vehicle, when the vehicle is driving on the one or more road segments indicated by the road map data. The pre-defined behavior of a driver of the vehicle may be referred to and/or part of a drive model. The pre-defined behavior of the vehicle may be referred to and/or part of a vehicle model. A technical benefit may include an enablement to predict how the vehicle and/or driver of the vehicle will drive on the one or more road segments, e.g., as part of the pre-defined behavior. Hence, a technical benefit may include that the predictions can be performed more accurately which further improves safety of the vehicle, its driver/passenger(s) and surrounding road users.

In some examples, predicting the future steering angle information of the vehicle for the long-term time period comprises predicting a distance between the vehicle and a road centerline, and predicting a future vehicle orientation of the vehicle. A technical benefit may include that the predictions can be performed more accurately which further improves safety of the vehicle, its driver/passenger(s) and surrounding road users.

In some examples, the vehicle comprises at least one trailer. In some of these examples, estimating a respective short-term and long-term risk for yaw instability of the vehicle comprises estimating a respective short-term and long-term risk for jack-knifing and/or trailer swing of the vehicle. A technical benefit may include enabling to estimate the risk for specific yaw instability events. This improves accuracy of the risk estimation as well as preventing the events. This is since the specific yaw instability event would be known and can thereby be handled accordingly. For example, the driver may be alerted of jack-knifing or a trailer swing and would then know how to react. Alternatively, the vehicle may perform a preventive action specifically for jack-knifing or for a trailer swing. Hence, a technical benefit may include further improvement of safety of the vehicle, its driver/passenger(s) and surrounding road users.

In some examples, determining whether or not to trigger the alert and/or to trigger the preventive action is based on comparing the respective short-term and long-term risk to at least one respective threshold. A technical benefit may include a further improvement of safety of the vehicle, its driver/passenger(s) and surrounding road users. This is since the vehicle and/or a driver of the vehicle can prevent the yaw instability based on either the short-term risk being too high with respect to short time period, and/or the long-term risk being too high with respect to a long time period.

In some examples, each of the respective short-term and long-term risk is compared with a respective warning threshold, and wherein it is determined to trigger the alert when any one or both of the respective warning thresholds are exceeded. A technical benefit may include a further improvement of the safety of the vehicle, its driver/passenger(s) and surrounding road users. This is since the vehicle and/or the driver of the vehicle may be efficiently alerted of the yaw instability before a dangerous situation occurs. The driver and/or the vehicle may take an appropriate action depending on whether the alert is associated with a high long-term risk or a high short-term risk.

In some examples, each of the respective short-term and long-term risk is compared with a respective intervention threshold, and wherein it is determined to trigger the preventive action when any one or both of the respective intervention thresholds are exceeded. A technical benefit may include a further improvement of the safety of the vehicle, its driver/passenger(s) and surrounding road users. This is since the preventive action may cause the vehicle to efficiently avoid the yaw instability before a dangerous situation occurs and/or to mitigate its dangerous elements. The preventive action can be arranged to be an appropriate action based on whether there is a high long-term risk and/or a high short-term risk.

In some examples, the method further comprises: by the processor device, when determined to trigger an alert, triggering the alert. In these examples, the alert indicates that the vehicle is in risk of yaw instability. A technical benefit may include a further improvement of the safety of the vehicle, its driver/passenger(s) and surrounding road users. This is since the vehicle and/or the driver of the vehicle may be efficiently alerted of the yaw instability before a dangerous situation occurs. The driver and/or the vehicle may take an appropriate action depending on whether the alert is associated with a high long-term risk or a high short-term risk.

In some examples, an alert level of the triggered alert is based on a combination of the short-term risk and the long-term risk. A technical benefit may include a further improvement of the safety of the vehicle, its driver/passenger(s) and surrounding road users. This is since the vehicle and/or the driver of the vehicle may be efficiently alerted based on both the risk of the short-term and long-term risk. For example, if the alert is a sound alert and/or a light alert, the alert level of the light and/or sound may relate to emitting a different sound and/or light when both the short-term risk and the long-term risk is above a respective threshold. In this way, a driver and/or a vehicle may be able to be alerted such that they can take appropriate preventive action to manage both risks accordingly.

In some examples, the method further comprises: by the processor device, when determined to trigger a preventive action, triggering the preventive action. In these examples, the preventive action causes the vehicle to prevent a yaw instability of the vehicle. A technical benefit may include a further improvement of the safety of the vehicle, its driver/passenger(s) and surrounding road users. This is since the preventive action may cause the vehicle to efficiently avoid the yaw instability before a dangerous situation occurs and/or to mitigate its dangerous elements. The preventive action can be arranged to be an appropriate action based on whether there is a high long-term risk and/or a high short-term risk.

In some examples, triggering the preventive action causes the vehicle to adjust a steering wheel angle and/or a longitudinal motion of the vehicle. A technical benefit may include a further improvement of the safety of the vehicle, its driver/passenger(s) and surrounding road users. This is since adjusting the steering wheel angle and/or longitudinal motion of the vehicle may cause the vehicle to efficiently avoid the yaw instability before a dangerous situation occurs.

In some examples, triggering the preventive action causes the vehicle to reduce a speed of the vehicle. A technical benefit may include a further improvement of the safety of the vehicle, its driver/passenger(s) and surrounding road users. This is since reducing the speed of the vehicle may cause the vehicle to efficiently avoid the yaw instability before a dangerous situation occurs.

In some examples, triggering the preventive action comprises: when a high short term risk is estimated, re-distributing a brake force and/or propulsion force of the vehicle, but when a high long term risk is estimated and a low short term risk is estimated, decreasing a speed of the vehicle, or preventing an increase of speed of the vehicle. A technical benefit may include a further improvement of the safety of the vehicle, its driver/passenger(s) and surrounding road users. This is since a clear strategy for handling different situations of long-term and short-term risks is provided. This improves safety as for short-term risks. This is since it may not be possible to mitigate or remove dangerous situations related to yaw instability by reducing a speed as there may not be enough time in the short-term period. Instead, re-distributing a brake force and/or propulsion force to different wheels can stabilize the vehicle while still allowing the vehicle to brake with a requested brake force. When a high long term risk is estimated and a low short term risk is estimated, decreasing a speed of the vehicle, or at least preventing an increase of speed of the vehicle may instead be a more efficient decision to stabilize the vehicle which can be performed if the risk of yaw instability is during the long-term time period.

In some examples, triggering the preventive action comprises: when a high short term risk for jack-knifing is estimated, increase brake force of at least one trailer of the vehicle, but when a high short term risk for a trailer swing is estimated, decrease brake force of the at least one trailer of the vehicle. A technical benefit may include a further improvement of the safety of the vehicle, its driver/passenger(s) and surrounding road users. This is since different braking strategies may appropriately be performed for jack-knifing and trailer swings. Thus, different yaw instabilities can be efficiently handled. An additional example is for an accelerating vehicle, to stop to propel, or reduce the propulsion torque/force.

In some examples, the separate prediction models for the short-term time period and the long-term time period further predicts a future lateral motion for the short-term period, and a future lateral motion for the long-term period, and wherein estimating the respective short-term and long-term risk for yaw instability of the vehicle is further based on the respective future lateral motion. A technical benefit may include a further improvement of the safety of the vehicle, its driver/passenger(s) and surrounding road users. This is since the predictions may be performed with higher accuracy when also considering the lateral motions in the prediction models. Consequently the risk-estimations are improved, which further improves handling yaw instability and thereby improves safety of the vehicle, its driver/passenger(s) and surrounding road users.

In some examples, the separate prediction models for the short-term time period and the long-term time period further predicts a future yaw motion for the short-term period and a future yaw motion for the long-term period, and wherein estimating the respective short-term and long-term risk for yaw instability of the vehicle is based on the respective future yaw motion. A technical benefit may include a further improvement of the safety of the vehicle, its driver/passenger(s) and surrounding road users. This is since the predictions may be performed with higher accuracy when also considering the yaw motions in the prediction models. Consequently, the risk-estimations are improved, which further improves handling yaw instability and thereby improves safety of the vehicle, its driver/passenger(s) and surrounding road users. The separate prediction models may comprise a vehicle model modelling a pre-defined behavior of the vehicle. The separate prediction models may comprise a driver model modelling a pre-defined behavior of the driver of the vehicle. Additionally, for further accuracy, a tire model may be used.

According to a second aspect of the disclosure, a vehicle is provided. The vehicle comprises a processor device to perform the method according to the first aspect. In some examples, the vehicle comprises at least one trailer. Advantages and effects of the vehicle are largely analogous to the advantages and effects of the method according to the first aspect. Further, all embodiments of the vehicle are applicable to and combinable with all embodiments of the method according to the first aspect, and vice versa.

According to a third aspect of the disclosure, a computer program product is provided. The computer program product comprises program code for performing, when executed by the processor device, the method according to the first aspect. Advantages and effects of the computer program product are largely analogous to the advantages and effects of the method according to the first aspect. Further, all embodiments of the computer program product are applicable to and combinable with all embodiments of the method according to the first aspect, and vice versa.

According to a fourth aspect of the disclosure, a control system is provided. The control system comprises one or more control units configured to perform the method according to the first aspect. Advantages and effects of the control system are largely analogous to the advantages and effects of the method according to the first aspect. Further, all embodiments of the control system are applicable to and combinable with all embodiments of the method according to the first aspect, and vice versa.

According to a fifth aspect of the disclosure, a non-transitory computer-readable storage medium is provided. The non-transitory computer-readable storage medium comprises instructions, which when executed by the processor device, cause the processor device to perform the method according to the first aspect. Advantages and effects of the non-transitory computer-readable storage medium are largely analogous to the advantages and effects of the method according to the first aspect. Further, all embodiments of the non-transitory computer-readable storage medium are applicable to and combinable with all embodiments of the method according to the first aspect, and vice versa.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

A yaw instability in a vehicle, e.g., a trailer swing or a jack-knifing event, may cause a dangerous situation for a driver of the vehicle and the surroundings of the vehicle. Typically, by conventional methods, jack-knifing or trailer swing may be detected, but at that point, these events have already started to occur, and then the driver and/or the vehicle may not have enough time to react to properly mitigate or remove the dangers of the yaw instability. Hence, embodiments herein relate to estimating a risk for future yaw instabilities in vehicles and preventing dangerous situations that may occur due to these yaw instabilities based on the risk. The yaw instabilities may be for any potentially dangerous yaw instabilities but may also be limited to any one or both of jack-knifing and/or trailer swings. Embodiments herein relates to both a short-term risk and a long-term risk, and thereby the dangerous situations can be handled in an efficient manner based on how long time is available for handling the yaw instability.

Figure 1:
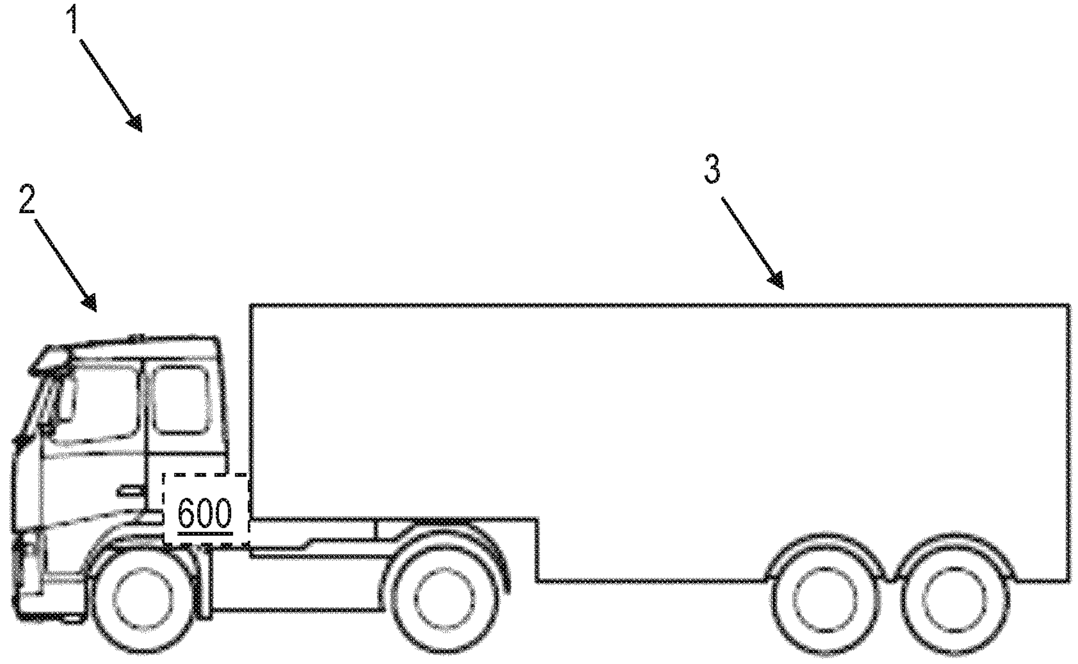
FIG. 1 is an exemplary vehicle according to one example.

FIG. 1 is an exemplary vehicle 1 according to one example. The vehicle 1 may comprise a tractor 2 pulling at least one trailer 3. While exemplified as a tractor pulling at least one trailer, the vehicle 1 may also be any other suitable vehicle which may experience yaw instability, e.g. any heavy-duty vehicle, a bus, a car etc. Embodiments herein may use two different prediction models, one for a short-term time period, e.g., within 1 second in the future, and one for a long-term time period, e.g., after the short-term time period, e.g., 5-30 seconds in the future. The different predictions models predict respective future steering angle information and future longitudinal motion of the vehicle 1. The steering angle information may for example comprise an angle and/or an angular rate, i.e. how the angle is changing over time. The longitudinal motions may for example comprise any one or more out of a speed, velocity, and/or acceleration of the vehicle 1. The prediction may be based on current steering angle information and longitudinal motion of the vehicle 1 and/or any other suitable parameters. The current measurements and/or parameters may be obtained in any suitable manner, e.g. by sensors of the vehicle 1 and/or may be predefined when applicable. Based on the respective predicted future steering angle information and future longitudinal motion of the vehicle 1, it is estimated a respective short-term and long-term risk for yaw instability of the vehicle 1. Hence, using these risks, it is possible to determine whether or not to act based on a potential yaw instability, i.e., to determine whether or not to trigger an alert and/or to trigger a preventive action for preventing a yaw instability of the vehicle 1. Embodiments herein may be performed using a computer system 600, e.g. as part of an Electronic Control Unit (ECU) in the vehicle 1.

Figure 2:
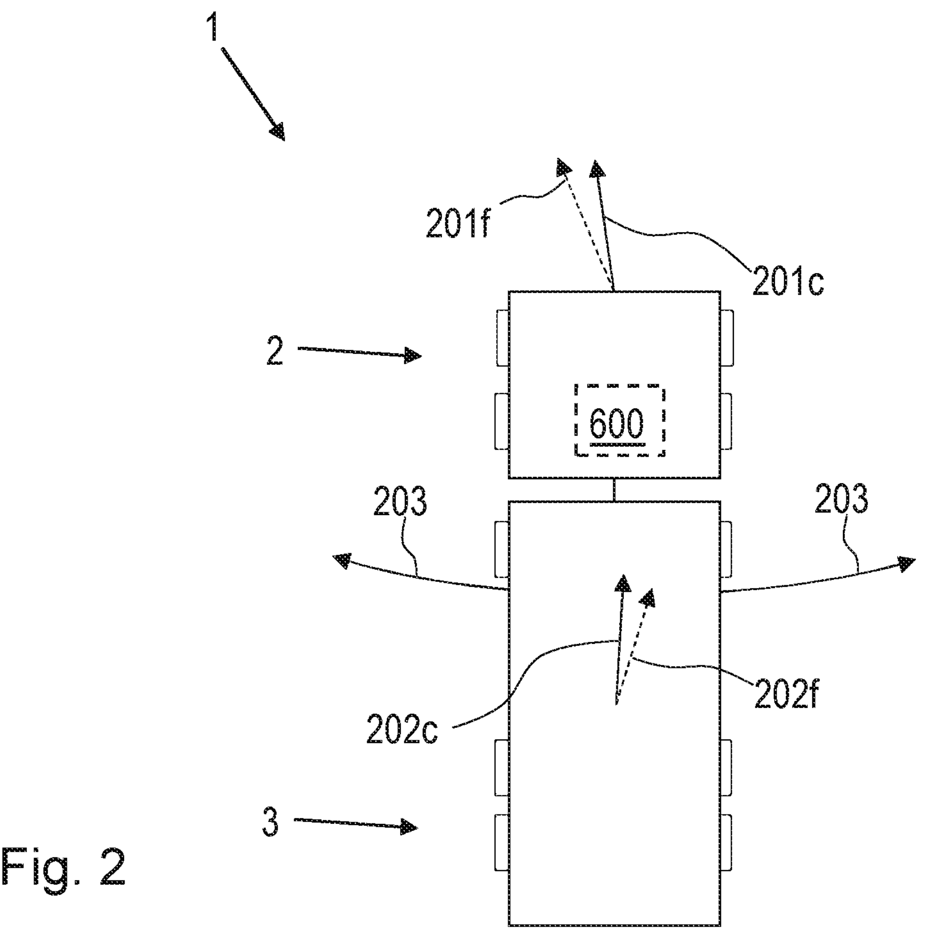
FIG. 2 is an exemplary scenario according to one example.

FIG. 2 is another example view of a vehicle 1, according to another example. In this example scenario, a current steering angle information and longitudinal motion of the vehicle 1 is represented as a current steering and longitudinal vector 201*c*, e.g., for the whole vehicle 1 or for the tractor 2 of the vehicle 1. For some embodiments, the current steering angle information and longitudinal motion of the vehicle 1 may further comprise a current steering and longitudinal trailer vector 202*c*. Using prediction models of embodiments herein, a future steering angle information and a future longitudinal motion of the vehicle 1 may be predicted. The future steering angle information and the future longitudinal motion may be represented as a future steering and future longitudinal vector 201*f*, e.g., for the whole vehicle 1 or for the tractor 2 of the vehicle 1. For some embodiments the future steering angle information and the future longitudinal motion may further be represented as future steering and future longitudinal trailer vector 202*f*. The current and future vectors 201*c*, 201*f*, 202*c*, 202*f*, of the example may also represent lateral motions and/or yaw motions of the vehicle 1. Based on the future steering angle information and longitudinal motions, a risk for a yaw instability may be estimated. The yaw instability may cause lateral force 203 on the vehicle 1 which may endanger the vehicle 1 and its surroundings. For example, the vehicle 1 may risk a jack-knifing or trailer swing of the at least one trailer 3.

Figure 3:
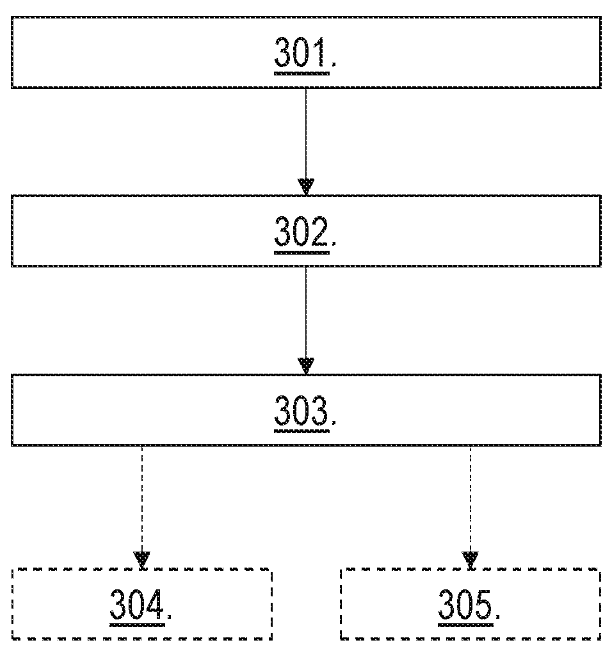
FIG. 3 is a flow chart of an exemplary method according to one example.

FIG. 3 is a flow chart of a method according to one example. The exemplary method is a computer-implemented method for handling yaw instability of the vehicle 1.

The method comprises the following actions, which actions can be taken in any suitable order. The method actions may be performed by a processor device of a computer system.

Action 301.

The method comprises using separate prediction models for a short-term time period and a long-term time period for predicting a future steering angle information for the short-term time period, a future steering angle information for the long-term time period, a future longitudinal motion of the vehicle 1 for the short-term time period and a future longitudinal motion of the vehicle 1 for the long-term time period. The short-term time period is shorter than the long-term time period. The short-term time period and the long-term time period may overlap or may be distinct time intervals. The short-term time period may relate to a time period of up to 1 or 2 seconds in the future. The long-term time period may relate to up to 30 seconds in the future, e.g. a time period of 5-30 seconds in the future. The prediction models may comprise any suitable information of the vehicle 1 and/or its driver. The prediction models may be modelled based on a behavior expected from the vehicle and/or its driver based on its respective short-term or long-term time period.

In some embodiments, predicting the future steering angle information and respective future longitudinal motion of the vehicle 1 for the short-term time period may be based on a current and/or longitudinal motion of the vehicle 1 and on current and historical steering angle information and/or longitudinal motions of the vehicle 1, e.g., using a trend or delta based on both current and historical steering angle information and/or longitudinal motions of the vehicle 1, or using same values as in the current or historical steering angle information and/or longitudinal motions of the vehicle 1.

Predicting the future steering angle information of the vehicle 1 for the short-term time period may be based on assuming that the steering wheel rate for a previous short time period, e.g., 1 to 2 seconds, stays the same, i.e. remains constant.

Additionally or alternatively, predicting the future longitudinal motion of the vehicle 1 for the short-term time period may be based on assuming that the acceleration of the vehicle 1 for a previous short time period, e.g., 1 to 2 seconds, stays the same, i.e. remains constant.

In some embodiments, predicting the future steering angle information and/or the future longitudinal motion for the short-term time period comprises estimating a rate of change in the current steering angle information based at least partly on the historical steering angle information and/or a rate of change in the current longitudinal motion based at least partly on the historical longitudinal motion of the vehicle 1. In some of these embodiments, predicting the future steering angle information and/or the future longitudinal motion is based on the estimated rate of change.

In some embodiments, predicting the future steering angle information and/or the future longitudinal motion for the short-term time period comprises predicting that the future steering angle information and/or the future longitudinal motion is within a predefined range of the current and historical steering angle information and/or longitudinal motion.

In some embodiments, predicting the future steering angle information and the respective future longitudinal motion of the vehicle 1 for the long-term time period is based at least partly on road map data for one or more road segments which the vehicle 1 is expected to drive on. The road map data may be obtained as stored from a storage medium of the vehicle 1 and/or may be obtained from a server external to the vehicle 1. The road map data may indicate any one or more out of road curvature, a friction coefficient, and/or a slope, e.g., inclination angle, for the one or more road segments.

In some embodiments, predicting the future steering angle information and/or respective future longitudinal motion of the vehicle 1 for the long-term time period is based at least partly on a pre-defined behavior of the vehicle 1 and/or based at least partly on a pre-defined behavior of a driver of the vehicle 1, when the vehicle 1 is driving on the one or more road segments indicated by the road map data. For example, it may be possible to know how using the pre-defined behavior the vehicle 1 and/or the driver of the vehicle 1 will operate the vehicle 1 when a certain type of turn and/or slope is part of the one or more road segments. The pre-defined behavior may be collected over time by training the prediction models, e.g., by training on data obtained from the driver driving one or more vehicles on different road segments, e.g., including or not including the vehicle 1, and/or training on data obtained from the vehicle 1 driving on different road segments. When training the pre-defined behavior it may be preferable to have at least some data from driving on the one or more road segments, however, it may suffice that the training data may be from other road segments. In some embodiments, the predefined behavior does not need to be trained, as it may also be defined manually and/or based on any suitable heuristics, e.g. by using a vehicle model and/or a driver model.

The vehicle model models the vehicle 1 as a mathematical and/or a physical system. For given inputs, the vehicle model will formulate how the vehicle 1 will behave, i.e., how states of the vehicle 1 will change, e.g., future longitudinal motion and/or future steering angle information. The vehicle model may comprise a very simple geometric and/or kinematic model with or without forces applied to the vehicle 1. Higher accuracy is achieved if the vehicle model comprises the forces applied to the vehicle 1. Additionally, a tire model may be used to predict how the tires will react to the steering wheel information and longitudinal motions, e.g., how it will affect the future longitudinal motions and/or future steering wheel information. The predictions may be used to improve accuracy of the vehicle model.

The driver model, on the other hand, models the driver of the vehicle's behavior with a mathematical model. Each driver may drive different and therefore the driver model may model a specific driver or may model a general driver. For the general driver, the driver model formulates the pre-defined behavior of the driver with equations and/or feedback control loops. For example, different parameters may be used as input to the driver model, e.g., any one or more out of: path and/or curvature info of a road segment, a longitudinal motion reference, e.g., a speed to follow, speed limit, speed measurement, a position and/or acceleration. The driver model may use these inputs and output any one or more out of: a future steering wheel angle, a future steering wheel rate, a future speed of the vehicle 1, and/or a future acceleration of the vehicle 1. The output of the driver model may be an input to the vehicle model.

There may be a feedback loop in the driver model to model the behavior of the driver. For example, if the driver's steering wheel angle does not follow an intended reference path, the driver may request to steer even more to reach to the reference path. Same for the speed/acceleration as a driver typically tries to follow a path not exactly where the vehicle is, but rather focuses some meters in front of the vehicle, e.g., referred to as a look ahead distance.

In some embodiments, predicting the future steering angle information of the vehicle 1 for the long-term time period comprises predicting a distance between the vehicle 1 and a road centerline, and predicting a future vehicle 1 orientation of the vehicle 1. In this way by predicting the distance between the vehicle 1 and the road centerline and the future orientation of the vehicle with respect to the road, e.g., the road centerline, it may be possible to predict the future steering angle information.

This difference of the road centerline and the vehicle 1 position gives a path tracking error, e.g., a lateral path error, and/or lateral displacement error. The tracking error may be part of the driver model as explained above, i.e. the driver model may have a mechanism that obtains information of the road centerline, e.g., by means of sensors or road map data, and compares the difference of the road centerline and the position of the vehicle 1 to get the path tracking error. According to embodiments herein, an aim is to reduce the path tracking error. The path tracking error may be fed back to the driver model such that it may be accounted for when estimating future and/or current vehicle states more accurately and/such that it may be possible to operate the vehicle 1 based on the path tracking error. The path tracking error may also be sent to the vehicle model. In other words, the path tracking error may be uses to predict a future behavior of the driver and/or the vehicle.

The driver model without a feedback loop, may obtain the reference path, and calculates a 5 degree steering angle request. But then the driver model may determine that the 5 degree is not enough to follow the reference path and results in a 1 meter lateral displacement error. In contrast, when the driver model comprises the feedback loop, the driver model may instead request for a 2 degrees additional steering angle to account for the displacement error. Then a resulting 7 degrees steering angle decreases the displacement error down to 10 cm.

In some of these embodiments, the displacement error may comprise a lateral path error and/or a yaw angle error. That means the difference of the orientation of the vehicle 1 and orientation of the road. Lateral path error may be measured in meters, and yaw angle error may be measured in degrees. For example, in some scenarios the vehicle 1 may be exactly on the road centerline, i.e. 0 lateral error, but the vehicle 1 may be orienting 30 degrees different direction compared to the road. A performance of path following may therefore typically be calculated by not only the lateral error but also yaw angle error.

In some embodiments, predicting the future steering angle information and/or respective future longitudinal motion of the vehicle 1 comprises predicting a future yaw rate of the vehicle 1, e.g., for any one or both of the short-term time period and the long-term time period.

In some embodiments, predicting the future steering angle information and/or respective future longitudinal motion of the vehicle 1 comprises predicting a future articulation angle between the tractor 2 and the at least one trailer 3 of the vehicle 1, e.g., for any one or both of the short-term time period and the long-term time period.

In some embodiments, predicting the future steering angle information and/or respective future longitudinal motion of the vehicle 1 comprises predicting a future lateral motion of the vehicle 1, e.g., for any one or both of the short-term time period and the long-term time period.

In some embodiments predicting, the future steering angle information and/or respective future longitudinal motion of the vehicle 1 comprises predicting a future side slip angle of the vehicle 1, e.g., for any one or both of the short-term time period and the long-term time period.

In some embodiments, predicting the future steering angle information and/or respective future longitudinal motion of the vehicle 1 comprises predicting a future longitudinal slip of the vehicle 1, e.g., for any one or both of the short-term time period and the long-term time period.

In some embodiments, predicting the future steering angle information and/or respective future longitudinal motion of the vehicle 1 comprises predicting a future lateral slip of the vehicle 1, e.g., for any one or both of the short-term time period and the long-term time period.

In some embodiments, predicting the future steering angle information and/or respective future longitudinal motion of the vehicle 1 is further based on an estimated or predefined friction coefficient of one or more road segments the vehicle 1 is travelling on. The friction coefficient may be measured by sensors in the vehicle 1, and may be assumed to be the same for the short term time period prediction. For the long-term time period prediction, the road map data may be obtained which indicates the friction coefficient.

In some embodiments, predicting the future steering angle information and/or respective future longitudinal motion of the vehicle 1 is further based on a brake force distribution of the vehicle 1. The brake force distribution may indicate respective brake forces on one or more brakes of the vehicle 1, typically but not limited to all brakes of the vehicle 1. The brake force distribution may for example cause a yaw motion on the vehicle which, independently or in combination with the other parameters, steering wheel angle, etc. may cause a yaw instability of the vehicle 1.

Additionally or alternatively, predicting the future steering angle information and/or respective future longitudinal motion of the vehicle 1 may be based on propulsion forces and their distribution on the vehicle 1, e.g., on multiple wheels. In the same way as brake force distribution, additionally or alternatively, the propulsion forces may also be distributed in a poor manner which may cause a yaw motion on the vehicle 1 which, independently or in combination with the other parameters, steering wheel angle, etc. may cause a yaw instability of the vehicle 1.

Any combination of the above-mentioned different future predicted parameters may be predicted by action 301.

Action 302.

The method comprises estimating a respective short-term and long-term risk for yaw instability of the vehicle 1. The estimation is based on the respective predicted future steering angle information and future longitudinal motion of the vehicle 1. The respective risks may be a risk, e.g., a probability, of that the yaw instability occurs within its respective period of time. The respective risks may be represented from 0 to 1 as a probability, or from 0% to 100%.

The estimated risks may additionally indicate a type of yaw instability, e.g., jack-knifing and/or trailer swing, for which the respective risk relates, e.g., as part of the respective risk and/or as part of an indicator with the respective risk. The type of yaw instability may be estimated as part of estimating the respective risks, e.g., using any suitable parameters predicted in action 301, and/or the type of yaw instability may be predefined such that the estimated risks are only estimated with regards to a risk of one or more types of yaw instability e.g., specifically estimated for trailer swing and/or jack-knifing of the vehicle 1.

As part of estimating the respective risks, e.g., using any suitable parameters predicted in action 301, a maneuver, e.g., one or more operations of the driver of the vehicle 1 and/or the vehicle 1, leading to the risk of a yaw instability may be determined.

As one example, when the vehicle 1 comprises at least one trailer 3, estimating the respective short-term and long-term risk for yaw instability of the vehicle 1 comprises estimating a respective short-term and long-term risk for jack-knifing and/or trailer swing of the vehicle 1. Embodiments herein may comprise risk estimation for any one or both jack-knifing and trailer swing.

The respective risks may be estimated based on the future states of the vehicle 1, as predicted by action 301. As an example, the estimated risks may respectively be based on any one or more out of:

- a predicted future steering angle information,
- a predicted future longitudinal motion,
- a predicted future yaw rate of the vehicle 1,
- a predicted future articulation angle between the tractor 2 and the at least one trailer 3 of the vehicle 1,
- a predicted future lateral motion of the vehicle 1,
- a predicted future longitudinal slip of the vehicle 1, and
- a predicted future side slip angle of the vehicle 1.

In other words, any of the above parameters may indicate that the vehicle will have a yaw motion that may be difficult to handle for the vehicle 1 and/or its driver.

The estimations of the risks may in some embodiments be at least partly based on heuristics for long and/or short time periods and/or based on predetermined models for the short and/or long time periods, e.g., any one or more out of the vehicle model, the driver models, and the tire models.

Action 303.

The method comprises determining whether or not to trigger an alert and/or to trigger a preventive action for preventing a yaw instability of the vehicle 1. The determination is performed on the basis of the estimated short-term risk and long-term risk, respectively. Triggering the alert may relate to triggering a light and/or sound alert for a driver of the vehicle 1 and/or surroundings of the vehicle 1. The alert may be an indication, e.g. through a tell-tale or other warning light that a yaw instability may occur in the short-term time period and/or the long-term time period. The alert may indicate a type of the yaw instability, e.g., jack-knifing or trailer swing.

In some embodiments, determining whether or not to trigger the alert and/or to trigger the preventive action is based on comparing the respective short-term and long-term risk to at least one respective threshold. The short-term risk and long-term risk may be compared to separate thresholds, a short-term threshold and a long-term threshold. In some embodiments herein, it may be determined to trigger the alert when the short-term risk is above the short-term threshold, when the long-term risk is above the long-term threshold, or a combination thereof. Additionally or alternatively, in some embodiments herein, it may be determined to trigger the preventive action, when the long-term risk is above the long-term threshold, or a combination thereof. For example, the threshold for a short-term threshold may typically be lower than the long-term threshold. This is since it may be a safer choice to always try to handle yaw instabilities in the short-term time period, even if there is only a slight chance that they will occur. For the long-term time period it may instead be more efficient to determine to trigger the alert and/or to trigger the preventive action when the risk is sufficiently high, e.g. over the long-term threshold, to avoid unnecessary alerts and/or preventive actions.

As an example, in some embodiments, each of the respective short-term and long-term risk may be compared with a respective warning threshold. In some of these embodiments, it is determined to trigger the alert when any one or both of the respective warning thresholds are exceeded. Additionally or alternatively, in some embodiments, each of the respective short-term and long-term risk is compared with a respective intervention threshold. In some of these embodiments, it is determined to trigger the preventive action when any one or both of the respective intervention thresholds are exceeded.

Action 304.

In some embodiments, the method may further comprise triggering an alert. Triggering the alert may be performed when it is determined to trigger the alert as in action 303. The alert may indicate that the vehicle 1 is in risk of yaw instability. The alert may indicate the type of yaw instability, e.g., trailer swing and/or jack-knife. The alert may be any suitable alert, e.g., a sound alert, a message, a light alert, a tell-tale light, etc. The alert may be for warning the driver of the vehicle 1 and/or surroundings of the vehicle 1, e.g., road users in a vicinity of the vehicle 1.

In some embodiments, the alert is triggered based on an alert level. The alert level may indicate a severity of the yaw instability based on the associated risks. For example, if the alert is a light alert, the color of the light may be adjusted based on the risk.

In some embodiments, the alert level of the triggered alert is based on a combination of the short-term risk and the long-term risk. In this way, the alert level may be arranged such that the triggered alert may at least partly indicate a risk level of both the short-term risk and the long-term risk, e.g., an adjusted alert when both risks are high, and/or adjusted based on which of the long-term and short-term risk is higher.

In some embodiments, the alert is triggered based on the determined maneuver, e.g., the one or more operations of the driver of the vehicle 1 and/or the vehicle 1, leading to the risk of the yaw instability, e.g., as described in action 302. In this way, the driver of the vehicle 1 and/or the vehicle 1 may be alerted of what may cause the yaw instability and can thereby perform suitable stabilizing operations.

Action 305.

In some embodiments, the method may further comprise triggering a preventive action. Triggering the preventive action may be performed when it is determined to trigger the preventive action as in action 303.

The preventive action causes the vehicle 1 to prevent a yaw instability of the vehicle 1, e.g., in any suitable manner. The preventive action may be one of many different preventive actions, where some preventive actions may generally be applicable, such as over the long-term period, decreasing a speed of the vehicle, and some may be more specifically tuned for certain way instabilities. In some embodiments, the preventive action may comprise stopping to increasing a speed of the vehicle 1, even in cases where the driver is requesting an increase of speed. In other words, a speed limit may be set on the vehicle 1, e.g., for its current speed or a lower speed.

The preventive action may be dependent on which type of yaw instability is predicted to occur and/or whether the yaw instability is estimated on the basis of the short-term period or the long-term period.

In some embodiments, triggering the preventive action causes the vehicle 1 to adjust a steering wheel angle and/or a longitudinal motion of the vehicle 1. For example, the steering wheel angle may be adjusted in a manner which would stabilize the vehicle 1. Additionally or alternatively, actions may be taken to reduce a longitudinal slip of the vehicle 1, in any suitable manner.

In some embodiments, triggering the preventive action causes the vehicle 1 to reduce a speed of the vehicle 1 or at least stop increasing a speed of the vehicle 1. This may be performed as a long term action when the long-term risk is high, e.g., by any one or more out of: increasing a brake force, reducing a propulsion force of the vehicle 1, and by the use of auxiliary brakes or retarders.

In some embodiments, the preventive action may comprise re-distributing a brake force of the vehicle 1. Additionally or alternatively, re-distribution of propulsion forces of the vehicle 1 may be performed.

In some embodiments, the preventive action may be based on the type of the yaw instability. For some embodiments herein, the yaw instability for which the risk is estimated, may be predefined. For example, the respective risks may always refer to jack-knifing or trailer-swing. In some embodiments, the type of yaw instability is predicted dynamically as part of, or prior to estimating the respective risk of yaw instability.

In some embodiments, triggering the preventive action comprises: when a high short term risk is estimated, re-distributing a brake force and/or propulsion force of the vehicle 1, but when a high long term risk is estimated and a low short term risk is estimated, decreasing a speed of the vehicle 1, or preventing an increase of speed of the vehicle 1. For when the high short-term risk is estimated, e.g., over the short-term threshold, redistributing the brake force of the vehicle 1 allows the vehicle to maintain a current brake force, e.g., requested by a driver, which may be necessary to provide safe operations of the vehicle 1, but may still be able to shift brake force to other wheels of the vehicle 1 such as to stabilize the vehicle 1.

In some embodiments, triggering the preventive action comprises: when a high short term risk for jack-knifing is estimated, increase brake force of at least one trailer 3 of the vehicle 1, i.e. stretch braking, but when a high short term risk for a trailer swing is estimated, decrease brake force of the at least one trailer 3 of the vehicle 1. In these embodiments, the preventive action may also comprise, decreasing a propulsion force of the vehicle 1 for both the high short term risk and the high long term risk.

In other words, as exemplified above, depending on the type of yaw instability, and what may be the main cause of the yaw instability, may affect what the preventive action shall be. The main cause of the yaw instability, e.g., too much or too little braking or speed in combination with a certain steering wheel angle or angular rate, may be predicted based on the separate prediction models.

In some embodiments, the preventive action is triggered based on the determined maneuver, e.g., the one or more operations of the driver of the vehicle 1 and/or the vehicle 1, leading to the risk of the yaw instability, e.g., as described in action 302. In this way, the vehicle 1 may efficiently perform suitable stabilizing operations. For example, for some types of maneuvers and types of yaw instability, a preventive action may be predefined.

Figure 4:
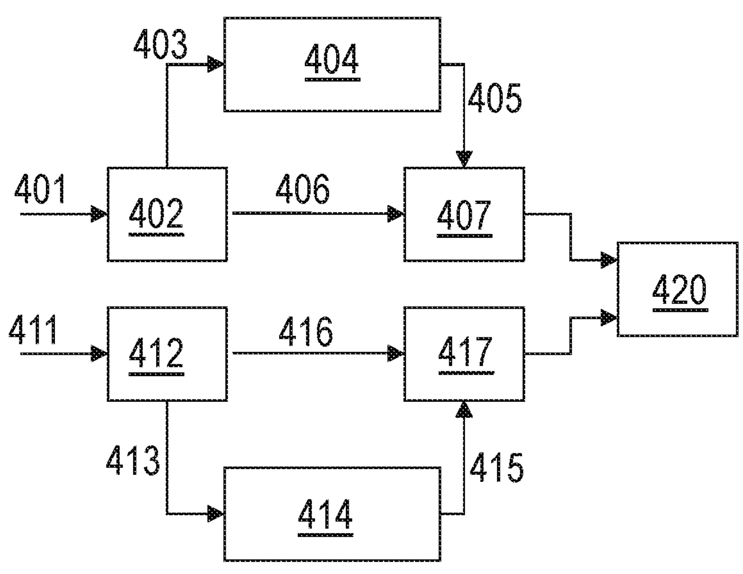
FIG. 4 is an example block diagram illustrating an example scenario according to one example.

FIG. 4 illustrates an example scenario according to an example herein. The example of FIG. 4 may be a variant of actions 301-305 above. Any of actions 301-305 may be incorporated into the embodiments of FIG. 4, and vice versa. In embodiments herein, two different approaches for the handling of yaw instability is performed, e.g., in the short-term time period and the long-term time period. In both methods, a vehicle kinematic model like a yaw-plane single-track model or a 2-track model, and a simple driver model may be used to predict required states for use in a yaw instability risk estimation, based on the current states estimates and/or estimated friction coefficients, e.g., as in action 301. Additionally, a tire model may be used to predict how the tires will react to the steering wheel information and longitudinal motions, e.g., how it will affect the future longitudinal motions and/or future steering wheel information. The predictions may be used to improve accuracy of the vehicle model.

Short-term prediction may relate to inputting short-term state inputs 401 to a short-term prediction model 402. The short-term state inputs 401 may comprise current and/or historical steering wheel angles and longitudinal acceleration, e.g., driver pedal requests and/or actuator forces, e.g., as in action 301. The short-term state inputs 401 may also comprise an articulation angle. Additionally or alternatively, the short-term inputs may comprise an estimated or predefined friction coefficient and/or a current brake force distribution between brakes/wheels of the vehicle 1. The short-term state inputs 401 may be used in the prediction describe in action 301.

The short-term prediction model may predict future steering wheel angles and/or vehicle longitudinal acceleration based on a short-term driver model as part of the short-term prediction model. Furthermore, lateral speed and acceleration may also be predicted as part of the short-term prediction model, e.g., as derived from the predicted future steering wheel angles and vehicle longitudinal acceleration. The short-term driver model may predict future states based at least partly on the current value of the steering angle and previous values. The future states may further be based on an articulation angle, and/or a longitudinal motion such as speed or acceleration.

An example short-term driver model may be based on a linear model over time, e.g., assuming a constant steering wheel angular rate, with predefined saturation limits to model physical limitations of an actuator. The outputs of the short-term driver model may be inputs to a vehicle model, e.g., as part of the short-term prediction model. The driver model and/or the vehicle model may output future steering wheel information, e.g., angle and/or rate, and future longitudinal motion such as speed and/or acceleration of the vehicle 1. The outputs may be combined together with other signals, e.g., any one or more out of: pre-determined and/or estimated road friction coefficient of one or more road segments, estimates of a vehicle velocity, e.g., longitudinal and/or lateral, a yaw rate of the vehicle 1, a yaw articulation angle of the vehicle 1, and/or a side slip angle of the vehicle 1. A typical time horizon length in the short-term prediction may be 1 second.

The short-term prediction model 402 may produce short-term prediction output 403, 406 representing future states of the vehicle 1 in the short-term time period, e.g., a future longitudinal motion and/or future steering wheel angle as in action 301. Additionally or alternatively, the short-term prediction output 403, 406 may comprise any one or more out of a future yaw rate of the vehicle 1, a predicted articulation angle between the tractor 2 and the at least one trailer 3, a longitudinal slip of the vehicle 1, and a side slip angle of the vehicle 1. A situation assessment unit 404 may determine a type of yaw instability of the short-term prediction output 403, if any. The situation assessment unit 404 may additionally or alternatively determine a maneuver that causes the yaw instability, e.g., too much or too little braking, improper braking, a turning maneuver, braking in a turning maneuver, and/or accelerating/propelling too much. Based on the determined type of yaw instability obtained 405 from the situation assessment unit 404 and based on the short-term prediction output 406, a risk evaluation unit 407 may estimate a risk for yaw instability in the short term period, e.g., as in action 302. The risk evaluation unit 407, may for some embodiments be a jack-knife detection unit which may detect jack-knifing based on the short-term prediction output 406 using any suitable jack-knifing detection method. Based on the risk of yaw instability, e.g., trailer swing or jack-knifing, a suitable action can be determined by a determination unit 420, e.g., whether or not to trigger an alert or a preventive action as in any of actions 303-305. The action may further be determined based on the determined maneuver that causes the yaw instability.

Long-term prediction may relate to inputting long-term state inputs 411 to a long-term prediction model 412. The long-term state inputs 411 may comprise current and/or historical steering wheel angles and longitudinal acceleration, e.g., driver pedal requests and/or actuator forces, e.g., as in action 301. Additionally or alternatively, the long-term inputs 411 may comprise a current brake force distribution between brakes/wheels of the vehicle 1. Additionally or alternatively, for the long-term prediction, the long-term state inputs 411 may comprise road map data for one or more road segments, e.g., comprising information of any one or more out of a road curvature, a road slope, a friction, and a traffic situation. The long-term state inputs 411 may be used in the prediction described in action 301.

The long-term prediction model may predict future steering wheel angles and/or vehicle longitudinal acceleration based on a long-term driver model as part of the long-term prediction model. Furthermore, lateral speed and acceleration of the vehicle 1 may also be predicted as part of the long-term prediction model, e.g., as derived from the predicted future steering wheel angles and vehicle longitudinal acceleration. Similar to the short-term prediction, the outputs of the long-term driver model may be inputs to a long-term vehicle model, but instead with a time horizon length in the order of 5-30 seconds, i.e. the long-term time period, and may at least partly be based on the road map data. For some embodiments, the road friction coefficient may be predefined as a constant during the long-term prediction horizon, i.e. the long-term time period, or may be determined dynamically using road information, using a camera, e.g., mounted on the vehicle 1, and/or obtaining information of the friction from a cloud service, e.g., from a server.

The long-term prediction model 412 may produce long-term prediction output 413, 416 predictions representing future states of the vehicle 1, e.g., a future longitudinal motion and/or future steering wheel angle as in action 301. Additionally or alternatively, the long-term prediction output 413, 416 may comprise any one or more out of a future yaw rate of the vehicle 1, a predicted articulation angle between the tractor 2 and the at least one trailer 3, a longitudinal slip of the vehicle 1, and a side slip angle of the vehicle 1. A situation assessment unit 414 may additionally or alternatively determine a type of yaw instability of the long-term prediction output 413. The situation assessment unit 414 may determine a maneuver that causes the yaw instability, e.g., too much or too little braking, improper braking, a turning maneuver, or braking in a turning maneuver.

Based on the determined type of yaw instability as obtained 415 from the situation assessment unit 414, and based on the long-term prediction output 416, e.g., jack-knifing or trailer swing, a risk evaluation unit 417 may estimate a risk for yaw instability in the long term period, e.g., as in action 302. The risk evaluation unit 417, may for some embodiments be a jack-knife detection unit which may detect jack-knifing based on the long-term prediction output 416 using any suitable jack-knifing detection method. Based on the risk of yaw instability, e.g., trailer swing or jack-knifing, a suitable action can be determined by the determination unit 420, e.g., whether to trigger an alert or a preventive action as in any of actions 303-305. The action may further be determined based on the determined maneuver causing the yaw instability.

In other words, depending on a combination of estimated risk in both the short-term time period and the long-term time period, and based on the respective determined maneuver that causes the yaw instability, the determination unit 420 of the vehicle 1 may determine to intervene and take control actions, such as braking the at least one trailer 3, decreasing a speed of the vehicle 1, decreasing a propulsion torque of the vehicle 1, and redistribute a brake force distribution of the vehicle 1. Additionally or alternatively, re-distribution of propulsion forces of the vehicle 1 may also be performed.

Figure 5:
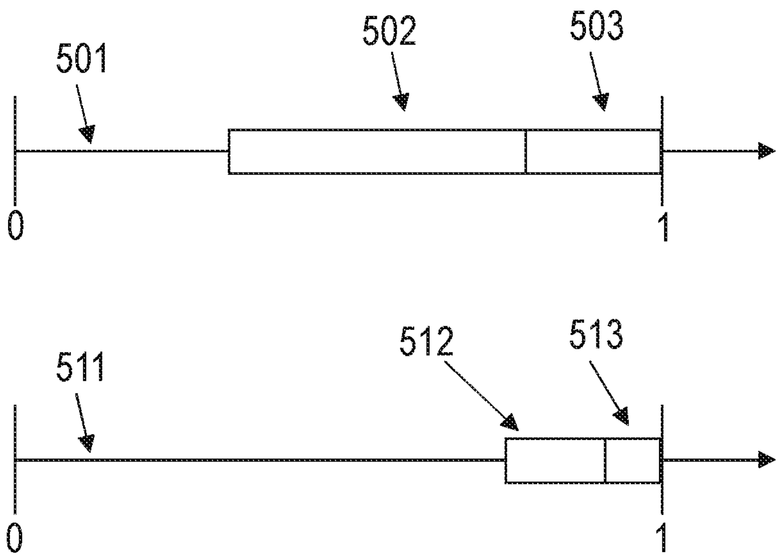
FIG. 5 is an example chart diagram illustrating an example scenario according to one example.

FIG. 5 illustrates an example scenario according to an example herein. FIG. 5 illustrates risks of yaw instability with respect to the short-term time period and the long-term time period.

A short-term risk range 501 illustrates how to determine whether or not to trigger an alert and/or a preventive action for the short-term time period, e.g., as in action 303. When the estimated risk of the short-term time period is within a short-term alerting interval 502, e.g., between 0.4-0.8, an alert is determined to be triggered. When the estimated risk of the short-term time period is within a short-term intervention interval 503, e.g., between 0.8-1.0, a preventive action is determined to be triggered.

A long-term risk range 511 illustrates how to determine whether or not to trigger an alert and/or a preventive action for the long-term time period, e.g., as in action 303. When the estimated risk of the long-term time period is within a long-term alerting interval 512, e.g., between 0.7-0.9, an alert is determined to be triggered. If the estimated risk of the long-term time period is within a long-term intervention interval 513, e.g., between 0.9-1.0, a preventive action is determined to be triggered.

Figure 6:
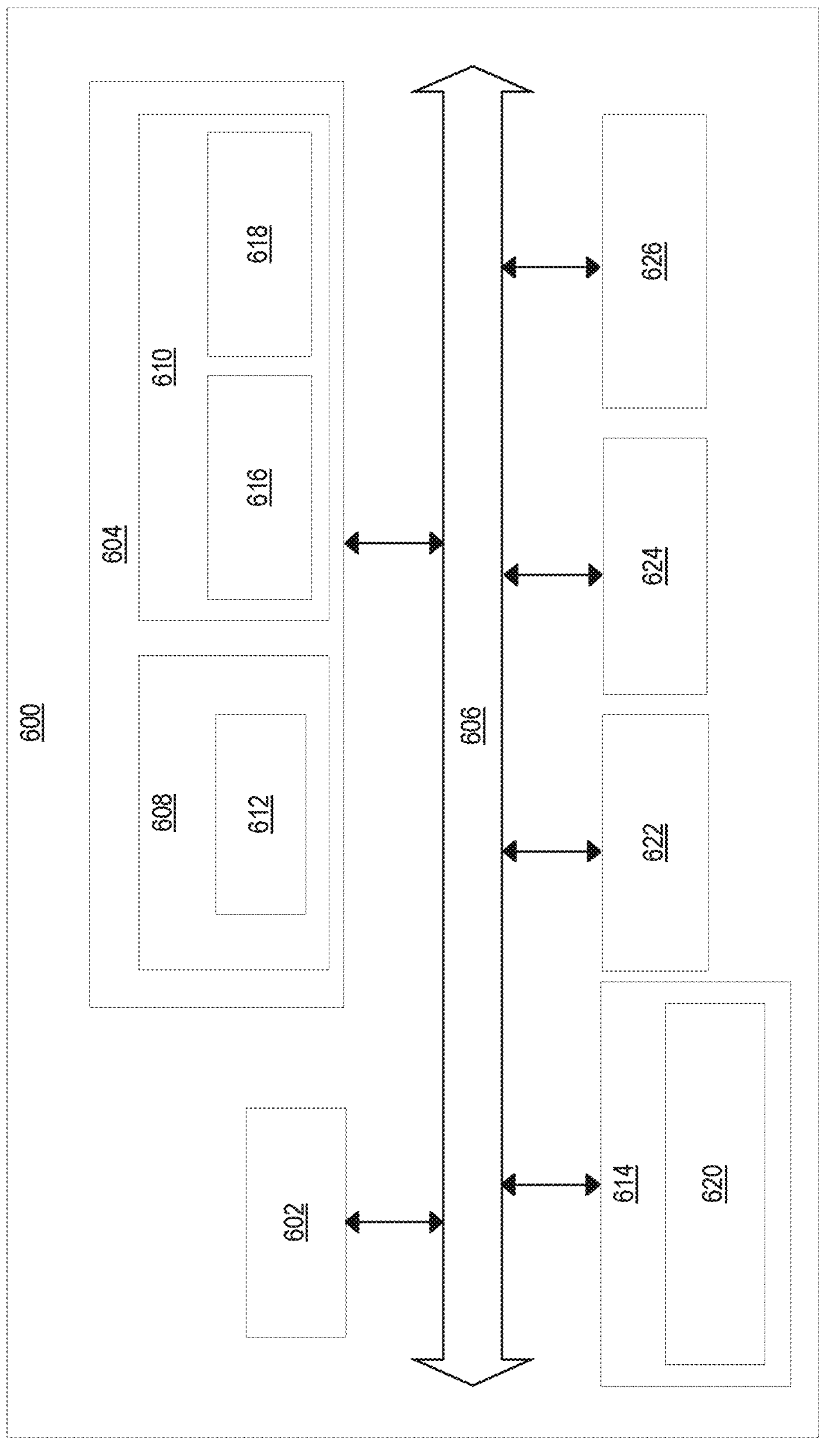
FIG. 6 is a schematic diagram of an exemplary computer system for implementing examples disclosed herein, according to one example.

FIG. 6 is a schematic diagram of the computer system 600 for implementing examples disclosed herein. The computer system 600 may be part of or communicatively coupled with a control system for controlling units of the vehicle 1, e.g. to perform any of actions 401-405. The computer system 600 may for example comprise any of the modules, models, units as described with respect to FIG. 4. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit, or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include a processor device 602 (may also be referred to as a control unit), a memory 604, and a system bus 606. The computer system 600 may include at least one computing device having the processor device 602. The system bus 606 provides an interface for system components including, but not limited to, the memory 604 and the processor device 602. The processor device 602 may include any number of hardware components for conducting data or signal processing or for executing computer code stored in memory 604. The processor device 602 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processor device 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with a processor device 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program product 620 stored on a transitory or non-transitory computer-usable or computer-readable storage medium (e.g., single medium or multiple media), such as the storage device 614, which includes complex programming instructions (e.g., complex computer-readable program code) to cause the processor device 602 to carry out the steps described herein. Thus, the computer-readable program code can comprise software instructions for implementing the functionality of the examples described herein when executed by the processor device 602. The processor device 602 may serve as a controller or control system for the computer system 600 that is to implement the functionality described herein.

The computer system 600 may also include an input device interface 622 (e.g., input device interface and/or output device interface). The input device interface 622 may be configured to receive input and selections to be communicated to the computer system 600 when executing instructions, such as from a keyboard, mouse, touch-sensitive surface, etc. Such input devices may be connected to the processor device 602 through the input device interface 622 coupled to the system bus 606 but can be connected through other interfaces such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may also include a communications interface 626 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer-implemented method for handling yaw instability of a vehicle, comprising:

by a processor device of a computer system, using separate prediction models for a short-term time period and a long-term time period for predicting future steering angle information for the short-term time period, future steering angle information for the long-term time period, a future longitudinal motion of the vehicle for the short-term time period and a future longitudinal motion of the vehicle for the long-term time period, wherein the short-term time period is shorter than the long-term time period, wherein predicting the future steering angle information and respective future longitudinal motion of the vehicle for the short-term time period is based on current and/or historical steering angle information and/or longitudinal motions of the vehicle, and wherein predicting the future steering angle information and/or the future longitudinal motion for the short-term time period comprises estimating a rate of change in the current steering angle information based at least partly on the historical steering angle information and/or a rate of change in the current longitudinal motion based at least partly on the historical longitudinal motion of the vehicle, and predicting the future steering angle information and/or the future longitudinal motion based on the estimated rate of change, by the processor device, based on the respective predicted future steering angle information and future longitudinal motion of the vehicle, estimating a respective short-term and long-term risk for yaw instability of the vehicle, and by the processor device, on the basis of the estimated short-term risk and long-term risk, respectively, determining whether or not to trigger an alert and/or to trigger a preventive action for preventing a yaw instability of the vehicle.

2. A computer-implemented method according to claim 1, wherein predicting the future steering angle information and/or the future longitudinal motion for the short-term time period comprises predicting that the future steering angle information and/or the future longitudinal motion is within a predefined range of the current and historical steering angle information and/or longitudinal motion.

3. A computer-implemented method according to claim 1, wherein predicting the future steering angle information and the respective future longitudinal motion of the vehicle for the long-term time period is based at least partly on road map data for one or more road segments which the vehicle is expected to drive on.

4. A computer-implemented method according to claim 3, wherein the road map data indicates a road curvature and/or a slope for the one or more road segments.

5. A computer-implemented method according to claim 3, wherein predicting the future steering angle information and/or respective future longitudinal motion of the vehicle for the long-term time period is based at least partly on a pre-defined behavior of the vehicle and/or based at least partly on a pre-defined behavior of a driver of the vehicle, when the vehicle is driving on the one or more road segments indicated by the road map data.

6. A computer-implemented method according to claim 3, wherein predicting the future steering angle information of the vehicle for the long-term time period comprises predicting a distance between the vehicle and a road centerline, and predicting a future vehicle orientation of the vehicle.

7. A computer-implemented method according to claim 1, wherein the vehicle comprises at least one trailer, and wherein estimating a respective short-term and long-term risk for yaw instability of the vehicle comprises estimating a respective short-term and long-term risk for jack-knifing and/or trailer swing of the vehicle.

8. A computer-implemented method according to claim 1, wherein determining whether or not to trigger the alert and/or to trigger the preventive action is based on comparing the respective short-term and long-term risk to at least one respective threshold.

9. A computer-implemented method according to claim 8, wherein each of the respective short-term and long-term risk is compared with a respective warning threshold, and wherein it is determined to trigger the alert when any one or both of the respective warning thresholds are exceeded.

10. A computer-implemented method according to claim 8, wherein each of the respective short-term and long-term risk is compared with a respective intervention threshold, and wherein it is determined to trigger the preventive action when any one or both of the respective intervention thresholds are exceeded.

11. A computer-implemented method according to claim 1, further comprising:

by the processor device, when determined to trigger an alert, triggering the alert, wherein the alert indicates that the vehicle is in risk of yaw instability.

12. A computer-implemented method according to claim 11, wherein an alert level of the triggered alert is based on a combination of the short-term risk and the long-term risk.

13. A computer-implemented method according to claim 1, further comprising:

by the processor device, when determined to trigger a preventive action, triggering the preventive action, which preventive action causes the vehicle to prevent a yaw instability of the vehicle.

14. A computer-implemented method according to claim 13, wherein triggering the preventive action causes the vehicle to adjust a steering wheel angle and/or a longitudinal motion of the vehicle.

15. A computer-implemented method according to claim 13, wherein triggering the preventive action causes the vehicle to reduce a speed of the vehicle.

16. A computer-implemented method according to claim 13, wherein triggering the preventive action comprises:

when a high short term risk is estimated, re-distributing a brake force and/or propulsion force of the vehicle, but when a high long term risk is estimated and a low short term risk is estimated, decreasing a speed of the vehicle, or preventing an increase of speed of the vehicle.

17. A computer-implemented method according to claim 13, wherein triggering the preventive action comprises:

when a high short term risk for jack-knifing is estimated, increase brake force of at least one trailer of the vehicle, but when a high short term risk for a trailer swing is estimated, decrease brake force of the at least one trailer of the vehicle.

18. A computer-implemented method according to claim 1, wherein the separate prediction models for the short-term time period and the long-term time period further predicts a future lateral motion for the short-term period, and a future lateral motion for the long-term period, and wherein estimating the respective short-term and long-term risk for yaw instability of the vehicle is further based on the respective future lateral motion.

19. A computer-implemented method according to claim 1, wherein the separate prediction models for the short-term time period and the long-term time period further predicts a future yaw motion for the short-term period and a future yaw motion for the long-term period, and wherein estimating the respective short-term and long-term risk for yaw instability of the vehicle is based on the respective future yaw motion.

20. A vehicle comprising a processor device configured to perform the method of claim 1.

21. A vehicle according to claim 20 comprising at least one trailer.

22. A computer program product comprising program code for performing, when executed by the processor device, the method of claim 1.

23. A control system comprising one or more control units configured to perform the method according to claim 1.

24. A non-transitory computer-readable storage medium comprising instructions, which when executed by the processor device, cause the processor device to perform the method of claim 1.

* * * * *